United States Patent
Hildinger et al.

(10) Patent No.: US 10,355,892 B2
(45) Date of Patent: Jul. 16, 2019

(54) TRANSMITTING MEANS FOR TRANSMITTING AN OUTPUT SIGNAL, RECEIVING MEANS FOR RECEIVING AN OUTPUT SIGNAL, AND METHODS FOR TRANSMITTING AND RECEIVING THE SAME

(71) Applicant: Fraunhofer-Gesellschaft zur Foerderung der angewandten Forschung e.V., Munich (DE)

(72) Inventors: Rainer Hildinger, Bamberg (DE); Andreas Tasch, Traunstein (DE); Shahram Zarei, Uttenreuth (DE); Conrad Zerna, Nuremberg (DE); Matthias Daeumler, Erlangen (DE); Carlos Ruiz Cabrera, Nuremberg (DE); Robert Koch, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 181 days.

(21) Appl. No.: 15/585,758

(22) Filed: May 3, 2017

(65) Prior Publication Data

US 2017/0237587 A1 Aug. 17, 2017

Related U.S. Application Data

(63) Continuation of application No. PCT/EP2015/075601, filed on Nov. 3, 2015.

(30) Foreign Application Priority Data

Nov. 4, 2014 (DE) .......................... 10 2014 222 511

(51) Int. Cl.
*H04L 25/497* (2006.01)
*H04L 25/03* (2006.01)

(52) U.S. Cl.
CPC .... *H04L 25/4975* (2013.01); *H04L 25/03343* (2013.01); *H04L 2025/0377* (2013.01); *H04L 2025/03356* (2013.01)

(58) Field of Classification Search
CPC .......... H04L 25/4975; H04L 25/03343; H04L 2025/03356; H04L 2025/0377
See application file for complete search history.

(56) References Cited

U.S. PATENT DOCUMENTS

| | | |
|---|---|---|
| 2003/0073464 A1 | 4/2003 | Giannakis et al. |
| 2007/0014380 A1 | 1/2007 | Gu et al. |
| 2007/0279196 A1 | 12/2007 | Macaluso et al. |

FOREIGN PATENT DOCUMENTS

| | | |
|---|---|---|
| JP | H05129890 A | 5/1993 |
| JP | 2004534447 A | 11/2004 |

(Continued)

OTHER PUBLICATIONS

Yongru Gu et al, "High-Speed Architecture Design of Tomlinson-Harashima Precoders", IEEE Transactions on Circuits and Systems-I; Regular Papers, vol. 54, No. 9, Sep. 2007 (Year: 2007).*

(Continued)

*Primary Examiner* — Jamal Javaid
*Assistant Examiner* — Thad N Defauw
(74) *Attorney, Agent, or Firm* — Perkins Coie LLP; Michael A. Glenn

(57) ABSTRACT

A transmitter for transmitting an output signal includes first and second filter structures. The first filter structure includes a first combiner to extend a first data signal by a first reference signal to obtain a first extended data signal, and a first IIR filter for filtering the first extended data signal to obtain a first filtered data signal. The second filter structure includes a second combiner to extend a second data signal by a second reference signal, and a second IIR filter for filtering the second extended data signal. The transmitter includes a multiplexer for combining the first and second filtered data signals to obtain the output signal. A system response of the first IIR filter based on the first reference signal corresponds to a system response of the second IIR filter based on the second reference signal.

25 Claims, 9 Drawing Sheets

(56) References Cited

FOREIGN PATENT DOCUMENTS

| JP | 2005032089 A | 2/2005 |
|---|---|---|
| JP | 2007519328 A | 7/2007 |
| JP | 2010021759 A | 1/2010 |
| WO | 2009117441 A2 | 9/2009 |

OTHER PUBLICATIONS

Gu, Yongru et al., "High-Speed Architecture Design of Tomlinson-Harashima Precoders", IEEE Transactions on Circuits and Systems-I; Regular Papers, vol. 54, No. 9, Sep. 2007, 9 pages.

* cited by examiner

TRANSMITTING MEANS FOR TRANSMITTING AN OUTPUT SIGNAL, RECEIVING MEANS FOR RECEIVING AN OUTPUT SIGNAL, AND METHODS FOR TRANSMITTING AND RECEIVING THE SAME

CROSS-REFERENCE TO RELATED APPLICATIONS

This application is a continuation of copending International Application No. PCT/EP2015/075601, filed Nov. 3, 2015, which is incorporated herein by reference in its entirety, and additionally claims priority from German Application No. DE 10 2014 222 511.6, filed Nov. 4, 2014, which is incorporated herein by reference in its entirety.

BACKGROUND OF THE INVENTION

The present invention relates to a transmitting means for transmitting an output signal, a receiving means for receiving an output signal, and methods for transmitting or receiving an output signal. The present invention also relates to highly parallel signal processing in filters for forward error correction (FEC), filters with infinite impulse response (IIR), in particular Tomlinson-Harashima precoding (THP) filters, and filters with finite impulse response (FIR) filters for multi-gigabit data transfer.

A serial baseband data transfer with a high throughput (in the multi-gigabit range), involves compensating for attenuation in the channel even when using a higher-order modulation method. The compensation filters are digitally implemented due to the higher linearity requirement (compared to binary modulation). Data processing in digital compensation filters is often parallelized for systems with multi-gigabit throughput since even modern CMOS processes (CMOS=Complementary Metal Oxide Semiconductor) are limited with regard to the maximum possible clock rates.

In general, FIR filters and IIR filters can be used to compensate for the transfer function. A Tomlinson-Harashima precoder, THP, is a particular form of the IIR filter.

To improve the bit error rate, block encoding is usually used in the form of forward error correction (FEC). Since a redundancy (parity bits) allocated to specific data is encoded in such methods, the data is decoded in the respective same block. This may involve a cyclic insertion of a known marker sequence, a so-called framing of the data, and a synchronization of the frame starts for processing.

Such high-bitrate serial links are also used in the multiplex operation for different data streams. For example, different buses, protocols and/or users are accumulated and separated again. Also, various data sources may be transmitted or received, e.g., to the network node, by a local connection of other networks and local data sinks/sources via the link.

A known solution for the present problem is illustrated in FIG. 8. Data 1002 from possibly different sources 1004 (data source DQ1, DQ2, . . . , DQn) is combined with a multiplexer 1006 into a serial data stream. In this case, the multiplexer can bring blocks of different sizes from different sources into any order. This serial data stream then passes through signal processing on the transmitting means side including a FEC 1008 and a predistortion by means of a THP filter 1012. Then, the data stream is transferred, i.e., the following occurs: a digital/analog (D/A) conversion 1014, a transfer via a medium 1016, an analog/digital (A/D) conversion 1018 and an optional amplification of the analog or digital signal. On the receiving means side, the signal passes through signal processing in the same or equivalent sequence. This includes a channel equalization (feedforward equalizer, FFE) by means of a FIR filter 1022 and a FEC 1024 on a decoder side (Dec). Thereafter, the data is re-divided by a demultiplexer 1026 and forwarded to various data sinks 1028 (DS1, DS2, . . . , DSn).

In order to increase throughput rates, a continuous parallelization of THP filters in conjunction with a decreasing efficiency at an increasing parallelization is known. A THP/IIR filter structure can be transformed such that feedback paths of the IIR filters are eliminated without or with a low delay. Due to the longer feedback paths, known pipelining strategies can be employed, which for a moderate increase in the achievable clock rates for IIR/THP filters. These methods remain limited due to the achievable clock rates in CMOS processes. For FIR filters, the methods Overlap-Save and Overlap-Add are known in order to increase clock rates.

SUMMARY

According to an embodiment, a transmitter for transmitting an output signal may have: a first filter structure having a first combiner configured to extend a first data signal by a first reference signal in order to acquire a first extended data signal, and having a first IIR filter for filtering the first extended data signal in order to acquire a first filtered data signal; a second filter structure having a second combiner configured to extend a second data signal by a second reference signal in order to acquire a second extended data signal, and having a second IIR filter for filtering the second extended data signal in order to acquire a second filtered data signal; a multiplexer for combining the first and second filtered data signals in order to acquire the output signal based on the filtered data signals; wherein a system response of the first IIR filter based on the first reference signal corresponds to a system response of the second IIR filter based on the second reference signal, wherein the first and second combiners are configured to insert the reference signal in front of and after a data block of the data signal, and wherein the IIR filters, the multiplexer or a signal former are configured to reject an acquired filtered reference signal based on the reference signal placed in front of so that the output signal has the filtered data signals and the filtered reference signals inserted after the data block and does not have the filtered reference signals inserted in front of the data block.

According to another embodiment, a receiver for receiving an output signal may have: a demultiplexer for generating a first and a second receiving signal from the received output signal, wherein the output signal has reference signals between data blocks of the output signal, which are a system-wide known preamble; a first receiving structure having a first equalization filter for equalizing the first receiving signal, and having a first separator configured to separate a first reference signal from the equalized first receiving signal; a second receiving structure having a second equalization filter for equalizing the second receiving signal, and having a second separator configured to separate a second reference signal from the equalized second receiving signal.

According to another embodiment, a transfer system may have: an inventive transmitter; an inventive receiver; wherein the transmitter and the receiver are coupled via a transfer medium.

According to another embodiment, a method for transmitting an output signal may have the steps of: extending a first data signal by a first reference signal in order to acquire a first extended data signal; filtering the first extended data signal with a first IIR filter in order to acquire a first filtered data signal; extending a second data signal by a second reference signal in order to acquire a second extended data signal; filtering the second extended data signal with a second IIR filter in order to acquire a second filtered data signal; combining the first and second filtered data signals in order to acquire the output signal based on the filtered data signals; wherein a system response of the first IIR filter based on the first reference signal corresponds to a system response of the second IIR filter based on the second reference signal, wherein the reference signal is inserted in front of and after a data block of the data signal, and wherein an acquired filtered reference signal is rejected based on the reference signal placed in front of so that the output signal has the filtered data signals and the filtered reference signals inserted after the data block and does not have the filtered reference signals inserted in front of the data block.

According to another embodiment, a method for receiving an output signal may have the steps of: generating a first and a second receiving signal from the received output signal, wherein the output signal has reference signals between data blocks of the output signal, which are a system-wide known preamble; equalizing the first receiving signal; separating a first reference signal from the equalized first receiving signal; equalizing the second receiving signal; separating a second reference signal from the equalized second receiving signal; and filtering a signal portion of the first or the second equalized receiving signal with a plurality of feedback filters in order to acquire a plurality of filtered signal portions according to the plurality of feedback filters in such a way that two successive signal portions partially overlap in an overlapping portion; combining the plurality of filtered signal portions to the filtered data signal and rejecting overlapping sequences of the filtered signal portions allocated to the overlapping portion of a first and a second filtered signal portion; and combining two filtered signal portions of two successive signal portions and rejecting an overlapping sequence with the overlapping portion of the second filtered signal portion following the first.

Another embodiment may have a non-transitory digital storage medium having a computer program stored thereon to perform the method for transmitting an output signal, having: extending a first data signal by a first reference signal in order to acquire a first extended data signal; filtering the first extended data signal with a first IIR filter in order to acquire a first filtered data signal; extending a second data signal by a second reference signal in order to acquire a second extended data signal; filtering the second extended data signal with a second IIR filter in order to acquire a second filtered data signal; combining the first and second filtered data signals in order to acquire the output signal based on the filtered data signals; wherein a system response of the first IIR filter based on the first reference signal corresponds to a system response of the second IIR filter based on the second reference signal, wherein the reference signal is inserted in front of and after a data block of the data signal, and wherein an acquired filtered reference signal is rejected based on the reference signal placed in front of so that the output signal has the filtered data signals and the filtered reference signals inserted after the data block and does not have the filtered reference signals inserted in front of the data block, when said computer program is run by a computer.

Another embodiment may have a non-transitory digital storage medium having a computer program stored thereon to perform the method for receiving an output signal, having: generating a first and a second receiving signal from the received output signal, wherein the output signal has reference signals between data blocks of the output signal, which are a system-wide known preamble; equalizing the first receiving signal; separating a first reference signal from the equalized first receiving signal; equalizing the second receiving signal; separating a second reference signal from the equalized second receiving signal; and filtering a signal portion of the first or the second equalized receiving signal with a plurality of feedback filters in order to acquire a plurality of filtered signal portions according to the plurality of feedback filters in such a way that two successive signal portions partially overlap in an overlapping portion; combining the plurality of filtered signal portions to the filtered data signal and rejecting overlapping sequences of the filtered signal portions allocated to the overlapping portion of a first and a second filtered signal portion; and combining two filtered signal portions of two successive signal portions and rejecting an overlapping sequence with the overlapping portion of the second filtered signal portion following the first, when said computer program is run by a computer.

A core idea of the present invention is to have recognized that the above object can be solved by the fact that signal processing of different data signals can already occur before multiplexing the same, and that by combining the data signals with a reference signal, an equal or comparable system response of the IIR filter with respect to the reference signal and with respect to other filtered data streams can be obtained. The equal or comparable system responses enable joining the different filtered data streams by the multiplexer so that the data stream obtained by the multiplexer acts (monolithically) as if filtered by a monolithic, i.e., single filter. This allows for a high net data throughput through the channel since the data stream can be continuously demodulated or decoded. In this way, a settling time of the equalizing filters can be reduced and/or a data throughput can be increased. Furthermore, channel coding can occur parallelized, which, when the filter complexity remains the same, leads to an increased data throughput by the increased number of filters. Furthermore, a power dissipation of the filters can be reduced by preadjusting the filters to a system response to be obtained, which the respective filter supplies as a response to the reference signal, so that providing the filter with the reference signal itself can partly be omitted, resulting in a reduced power dissipation of the filter.

According to an embodiment, a transmitting means includes a first filter structure comprising a first combiner configured to extend a first data signal by a first reference signal in order to obtain a first extended data signal. The first filter structure includes a first IIR filter for filtering the first extended data signal in order to obtain a first filtered data signal. The transmitting means includes a second filter structure comprising a second combiner configured to extend a second data signal by a second reference signal in order to obtain a second extended data signal. The second filter structure includes a second IIR filter for filtering the second extended data signal in order to obtain a second filtered data signal. This transmitting means includes a multiplexer for combining the first and second filtered data signals in order to obtain the output signal based on the filtered data signals. A system response of the first IIR filter based on the first reference signal corresponds to a system response of the second IIR filter based on the second reference signal. The first and second data signals can independently pass through a signal processing chain so that the filters can be parallelized and can generate a high throughput. Furthermore, based on the same or comparable system responses of the filters in response to the reference signals, the filtered data signals can be combined in the multiplexer without training symbols, which may take place in order to put receiving filters into a steady state.

According to a further embodiment, a receiving means for receiving an output signal includes a demultiplexer for generating a first and a second receiving signal from the received output signal. The receiving means further includes a first receiving structure comprising a first equalizing filter for equalizing the first receiving signal and a first separator configured to separate a first reference signal from the equalized first receiving signal. The receiving means further includes a second receiving structure comprising a second equalizing filter for equalizing the second receiving signal and a second separator configured to separate a second reference signal from the equalized second receiving signal. Such a receiving means enables a parallelized equalization of data streams so that, compared to known concepts, a throughput of the entirety of filters is increased.

Further embodiments relate to a transfer system comprising a transmitting means and a receiving means, a method for transmitting an output signal and for receiving an output signal as well as a computer program.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
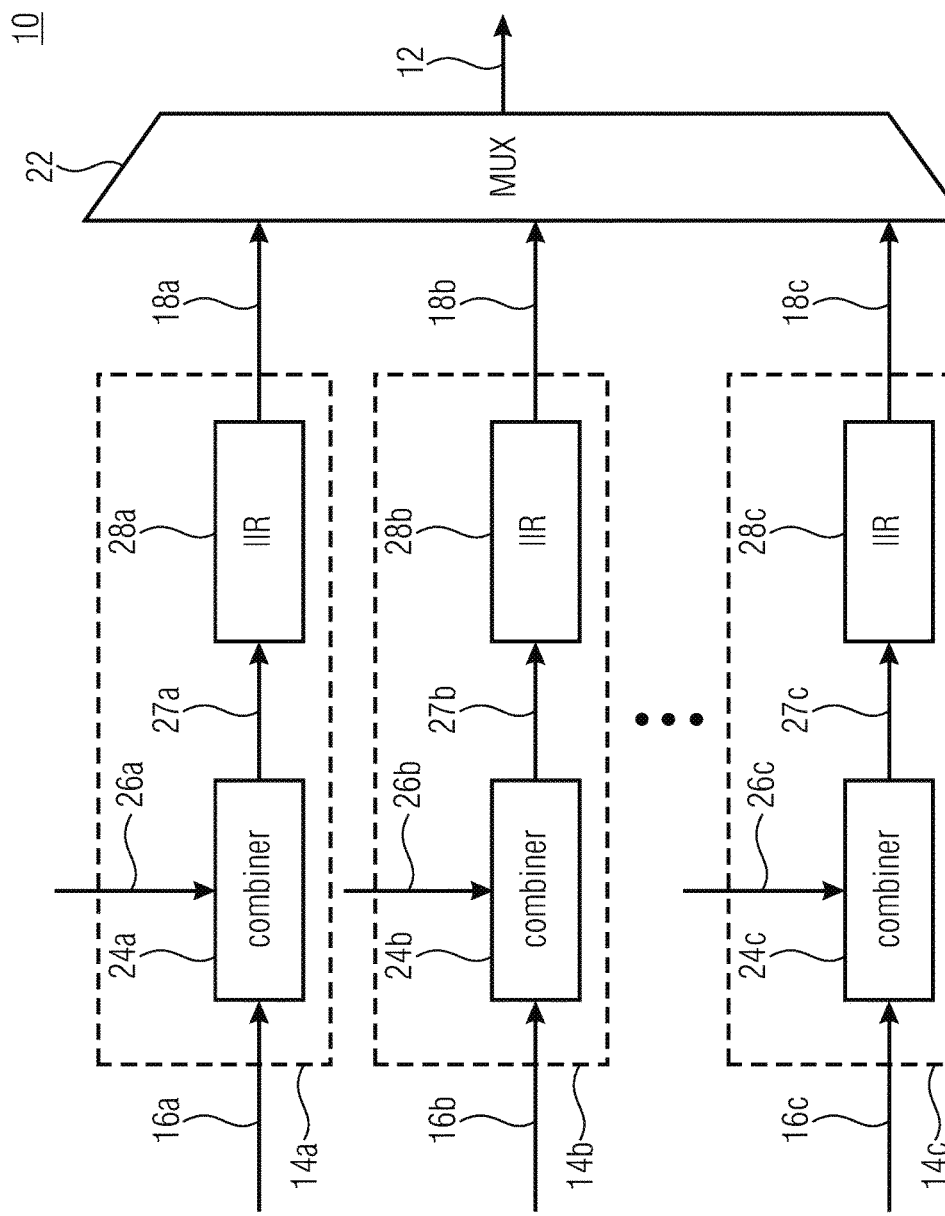
FIG. 1a shows a schematic block circuit diagram of a transmitting means for transmitting an output signal according to an embodiment.

Before embodiments of the present invention will be subsequently explained in detail with reference to the drawings, it shall be pointed out that identical, functionally identical and operatively identical elements, objects and/or structures are provided in the different figures with identical reference numerals so that description of these elements in different embodiments is interchangeable and/or mutually applicable.

FIG. 1a shows a schematic block circuit diagram of a transmitting means 10, e.g., a channel encoder, for transmitting an output signal 12 via a transfer medium, such as a wire connection or a glass fiber connection or a radio medium. The transmitting means 10 includes a plurality of filter structures 14a-c configured to each receive a data signal 16a-c and to provide a filtered data signal 18a-c. The data signals 16a-c can be data streams of different data sources, which are to be transferred. The data sources can be any kind of data source, e.g., a network node, a server, a PC, a hard disk, a video camera, a sensor or other devices providing or generating data to be transferred. The data signals can be received by a block encoder such as an FEC encoder which is configured to extend source data of the data source block by block with redundancy (information on error detection and error correction).

The transmitting means 10 includes a multiplexer 22, indicated by "MUX", configured to multiplex the filtered data signals 18a-c, i.e., to sequentially or serially join them, in order to obtain the output signal 12. The multiplexer 22 is further configured to output the output signal 12. A size and an order or position of subsequences from the filtered data signals 18a-c or parts thereof in the output signal 12 can each be configurable and dynamically adjustable, e.g., based on mutually different bit rates of the data signals 16a-c.

Each of the filter structures 14a-c comprises a combiner 24a, 24b and 24c, respectively, configured to receive the data signal 16a, 16b and 16c, respectively, and to combine the respective data signal 16a-c with a reference signal 26a, 26b and 26c, respectively, in order to obtain an extended data signal 27a, 27b and 27c, respectively. The reference signal can be a system-wide known data sequence (i.e., on the transmitting means side and on the receiving means side) inserted at a specific or predefined location of the respective data signal 16a-c. For example, the reference signal 26a-c is inserted between two data blocks of the respective data signal 16a-c. A data length of the reference signals 26a-c can be influenced by a function enabled in a receiving means of the output signal 12, as will be described below, and enables obtaining a comparable system response in different IIR filters of the transmitting means.

For example, a reference signal 26a-c can be combined with a data signal 16a-c such that the reference signal 26a-c can be added in its entirety or in part at one or several predetermined locations, e.g., at a beginning, at an end or at a defined position between the beginning and end of a data block of the respective data signal 16a-c. When the reference signal 26a-c is inserted at the beginning and/or at the end of a data block of the respective data signal 16a-c (i.e., between two data blocks), the respective IIR filter 28a-c has not yet been adequately influenced (trained) by the data of the reference signal 26a-c inserted at the beginning, when filtering the reference signal inserted at the beginning. For example, this can lead to data acting in a non-monolithic manner (i.e., containing a significant error signal in the vicinity of the transition points between the filters 28a-c) before the filtered data signal since the IIR filter 28a-c is not in a steady state. At the end of the data block, the filtered data signal 18a-c acts in a monolithic manner based on the obtained steady state. Before multiplexing, the data acting in a non-monolithic manner can be considered invalid and/or be removed from the data stream. Removing the invalid data can, e.g., occur in the respective IIR filter 26a-c, in the multiplexer 22 or by means of a calculating means which influences the filtered data signals 18a-c.

The reference signals 26a-c can be time-invariant or variable over different time intervals. For example, based on a variable signal power of the respective data signal 16a-c, the reference signals can comprise a signal power which is also variable and adapted, i.e., approximately equal, to the signal power of the data signal 16a-c. The reference signals 26a-c can be equal or comprise different information (bits or symbols and/or equal or different data lengths).

Each of the filter structures 14a-c includes an IIR filter 28a, 28b and 28c, respectively, configured to filter the respective extended data signal 27a, 27b or 27c. The IIR filters 28a-c are, e.g., configured as predistortion filters configured to precompensate an expected distortion of the output signal 12 in the transfer medium. The IIR filters 28a-c can comprise any IIR filter structure, among others, also a Tomlinson-Harashima filter structure (THP filter).

A statistical distortion of the filtered data signals 18a, 18b and 18c in the output signal 12 can be assumed to be equal since all the signals are transferred via the same channel in short time intervals. Correspondingly, a predistortion characteristic of the IIR filters 28a-c can be equal or comparable. According to an embodiment, the IIR filters 28a-c are configured as THP filters.

The IIR filters 28a-c are configured to filter the respective extended data signal 27a-c and, therefore, at times in its entirety or in part, the respective reference signal 26a-c and, at other times, the data signal 16a-c in its entirety or in part. A system response of the IIR filter 28a based on filtering the reference signal 26a can be compared at least at an end of the filtering process to a corresponding system response of the respective IIR filter 36b or 36c based on filtering the respective reference signals 26b or 26c.

When the IIR filter 28a filters the reference signal 26a, the reference signal 26a generates a corresponding system response in the filter 28a. The same applies to the IIR filter 28b with respect to the reference signal 26b and to the IIR filter 28c with respect to the reference signal 26c. When the IIR filters 28a-c comprise an equal filter length and equal coefficients, the reference signals 26a-c can be equal, i.e., the reference signals 26a-c can be the same signal. A system response of the IIR filters 28a-c, i.e., a respective partial output signal, is therefore equal or comparable based on the reference signal or signals 26a-c. The system responses of the IIR filters 28a-c can be equal or approximately equal based on the reference signals 26a-c. When the IIR filters 28a-c comprise an equal initial state, an equal filter structure and equal filter coefficients, and the same reference signals 26a-c apply to the IIR filters 28a-c, an equally steady state of the IIR filters also arises. However, when the IIR filters 28a-c comprise different initial states, e.g., based on mutually different data signals 16a-c, which have been filtered in a preceding manner, initial states also affect future system states based on the feedback structure of the filters 28a-c. The reference signals 26a-c comprise a length which reduces such effects to such an extent that these effects are negligible and the system responses are comparable.

Therefore, after multiplexing, the output signal 12 acts as if it were filtered, i.e., calculated, by only one filter. This enables an efficient equalization and decoding on the receiving means side.

This can be achieved in that the length of the reference signal 26a-c is at least twice as long (factor 2), at least three times as long (factor 3), at least five times as long (factor 5) or more than a filter length of the IIR filters 28a-c.

At portions of the filtered data signals 18a-c comprising a system response comparable to each other, the individual data streams can be joined by means of the multiplexer 22 and can thereby maintain a structure corresponding to a structure which would have been obtained by filtering a data stream through a filter so that a reduced or no settling time for receiving filters is needed on the receiving means side.

The transmitting means 10 can comprise any number of filtered structures 14a-c, for example 2, 3 or more.

Figure 1B:
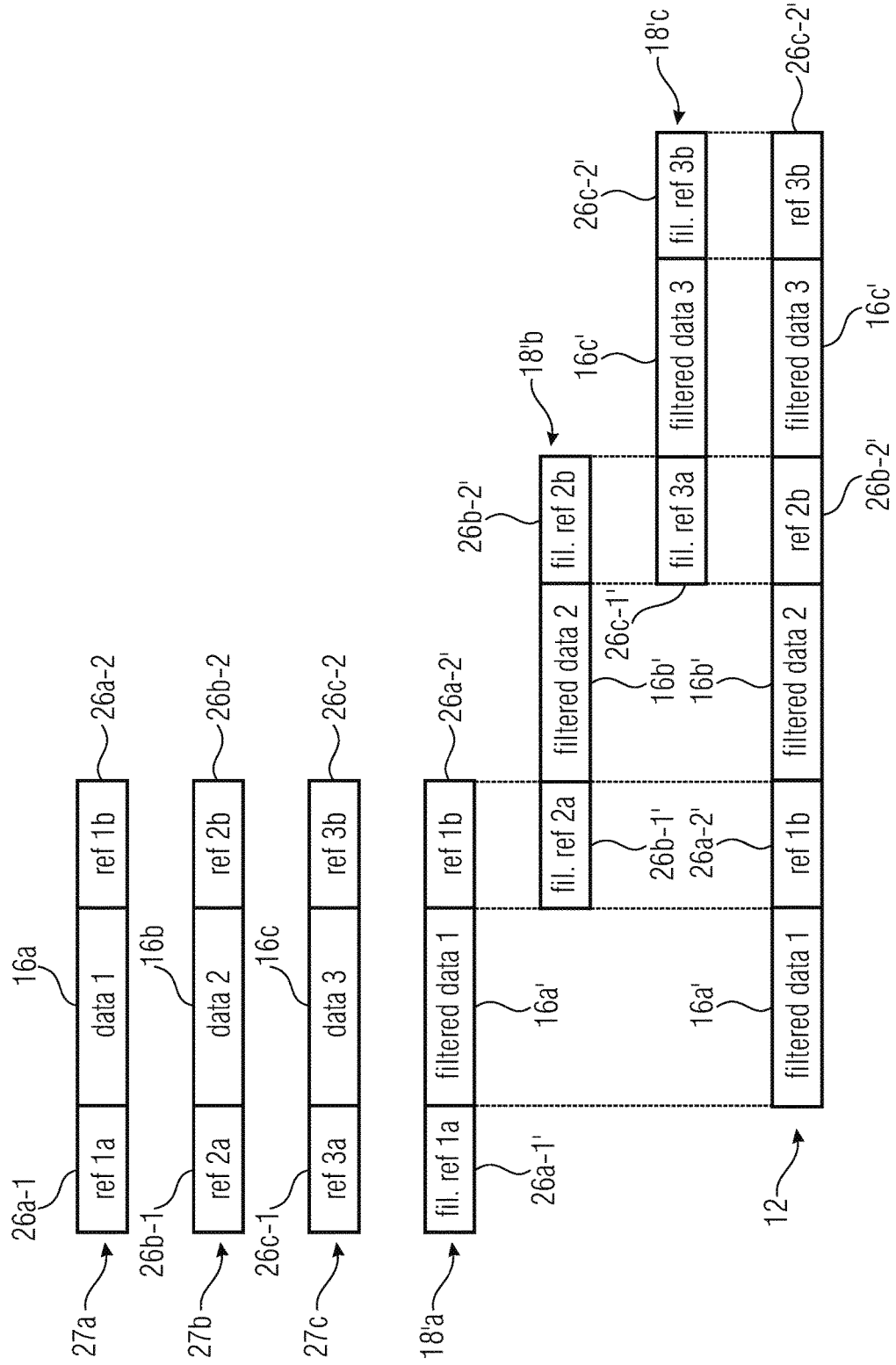
FIG. 1b shows a schematic comparison of the extended data signals, the filtered data signals and the output signal according to an embodiment.

FIG. 1b shows a schematic comparison of the extended data signals 27a, 27b and 27c. The extended data signals 27a-c each comprise a data block of the data signals 16a, 16b and 16c (Data 1, Data 2, Data 3), respectively, which are combined with the reference signals 26a-c such that the reference signal 26a-1, 26b-1 and 26c-1, respectively, is added in front of the data block, and the reference signal 26a-2, 26b-2 and 26c-2, respectively, is added after the data block. As an example, the reference signals comprise the same data lengths but can also be different from one another, as explained above. Alternatively or additionally, data lengths of the data signals 16a-c can also be equal or different from one another. Based on the extended data signals 27a-c, filtered data signals 18'a-c are obtained by filtering of the filters 28a-c. The filtered data signals 18'a-c differ from the filtered data signals 18a-c of FIG. 1a in that the filtered data signals 18'a-c (still) comprise the invalid preambles 26a-1', 26b-1' and 26c-1'.

The filtered data signals 18'a-c comprise an equal data structure (reference signal—data signal—reference signal) as the extended data signals 27a-c, the reference signals and the data signals being filtered, as indicated by the addition "fil." which stands for "filtered". The filtered data signal comprises the filtered reference signal 26a-1' in front of the filtered signal 16a' and the filtered reference signal 26a-2' after the same. The filtered data signals 18'b and 18'c comprise an equal structure. The filtered data signals 18'a-c are combined by means of the multiplexer 22 to the output signal 12.

The obtained output signal 12 comprises a (monolithic) structure, i.e., it acts as if filtered by a single IIR filter. Here, the output signal 12 obtained at a point in time depends on preceding filter operations of the filters filtering the respective data section. However, the respective filtered reference signals 26a-1', 26b-1' and 26c-1' placed in front are unaffected by the respective data sequences of the other extended or filtered data signals, which precede in the output signal 12. That means that the filtered reference signal 26a-1' can be unequal with respect to the filtered reference signal 26b-1' and/or 26c-1'. The filtered signals 16a'-c' are filtered by means of the reference signals 26a-1, 26b-1 and 26c-1 of filters in a steady state and are sufficiently influenced by these preceding signals. Likewise, the reference signals 26a-2', 26b-2' and 26c-2' appended are adequately influenced by the respective data signals 16a-c. This ensures that reference signal 26a-c (preamble) inserted in front of (and after) each data block 16a-c is transferred at the end of the respective filtered data block 16a'-c' since the preamble is considered to be invalid or is removed at the beginning of the data block and is correctly filtered and transferred at the end of the data block.

The monolithic structure of the output signal 12 can be obtained by configuring the multiplexer 22, the respective IIR filter 28a-c or a means (such as a signal former)

connected between the filters 28*a-c* and the multiplexer 22 to remove the respective filter responses 26*a*-1', 26*b*-1' or 26*c*-1', which are invalid or not sufficiently influenced, and to output the output signal 12 based on the sequentially connected filtered signals 16*a*'-c' and 26*a*-2', 26*b*-2' and 26*c*-2', respectively. This means that, as an alternative to the situation shown in FIG. 1*b*, the filtered data signals can also not comprise the respective invalid preamble 26*a*-1', 26*b*-1' and 26*c*-2', e.g., when the IIR filter is configured to remove the data, or when the IIR filter includes a signal former configured for this purpose, e.g., as described in connection with FIG. 3. In simplified terms, according to the embodiment, the preamble is calculated (filtered) twice, but transferred only once. For this purpose, a data block of data signals 16*a-c* is extended by two reference signals, wherein one (the one placed in front of the data signal 16*a-c*) is used to train the filter, however, the obtained filter response is rejected in order to obtain a low overhead (proportion of the status information or link management information). The respective reference signal 26*a*-2, 26*b*-2 and 26*c*-2 placed at the end of the data signal 16*a-c* is transferred in its respective filtered form 26*a*-1', 26*b*-1' and 26*c*-1'. The respective filter responses (filtered reference signals) 26*a*-1', 26*b*-1' and 26*c*-1' can be equal or comparable (i.e., negligible differences, possibly below the system noise).

One of the advantageous features of the present invention is that the combinations (or tuples) (16*a*', 26*a*-2'), (16*b*', 26*b*-2') and (16*c*', 26*c*-2') can be transmitted in any given order and that the resulting waveform appears in a monolithic manner, i.e., does not comprise errors at or in the vicinity of the transitions between the tuples.

Figure 2:
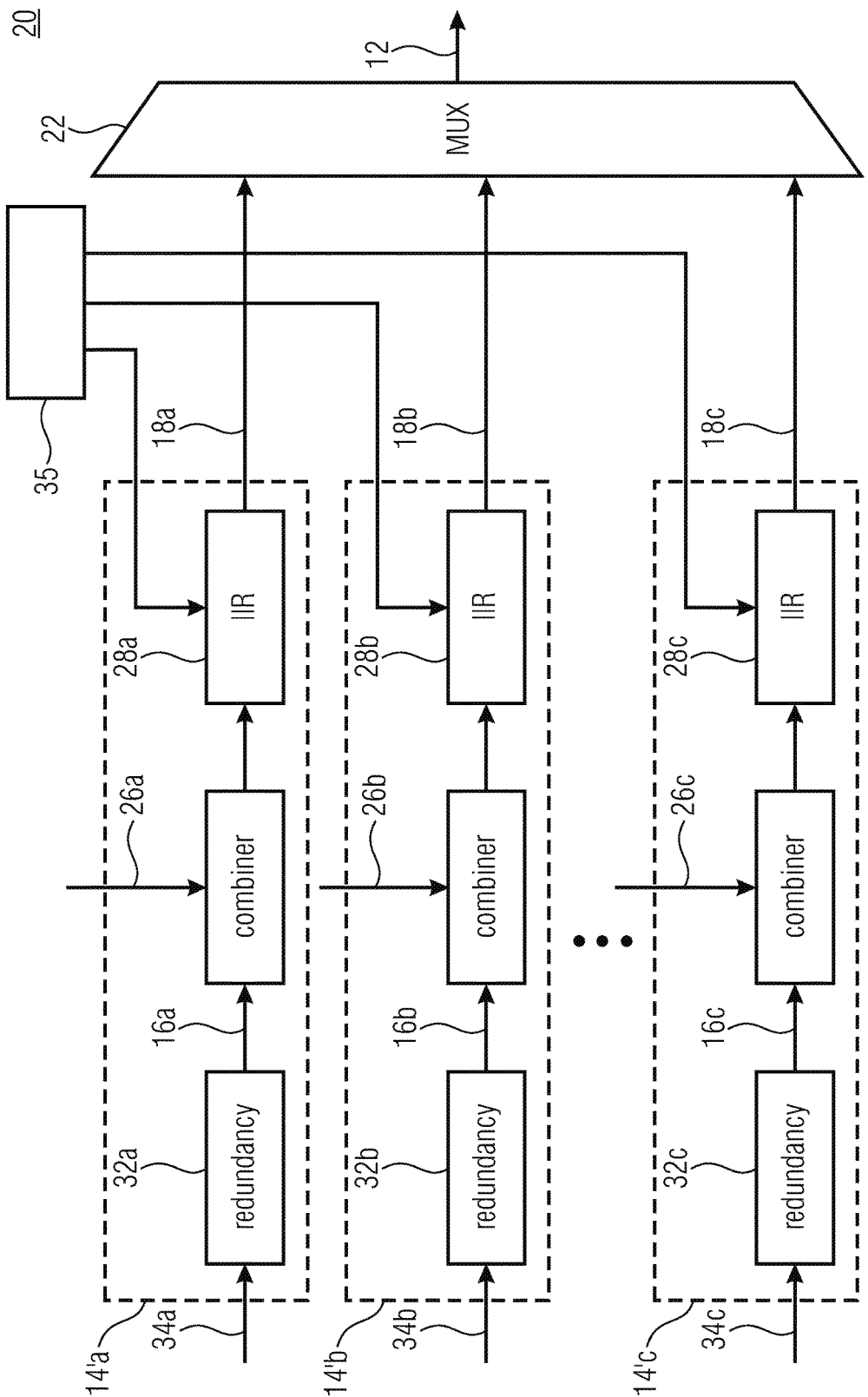
FIG. 2 shows a schematic block circuit diagram of a transmitting means, in which, in contrast to filter structures of the transmitting means of FIG. 1, filter structures comprise a calculating means according to an embodiment.

FIG. 2 shows a schematic block circuit diagram of a transmitting means 20, in which filter structures 14'*a-c*, in contrast to the filter structures 14*a-c* of FIG. 1, include a calculating means 32*a*, 32*b* and 32*c*, respectively, configured to receive a source signal 34*a*, 34*b* or 34*c* from a data source and to calculate redundancy information with respect to the respective source signal 34*a-c*. For example, the calculating means 32*a-c* can be a means for calculating redundancy symbols or redundancy bits or another precoding, which enables an error correction on the receiving means side. For example, the calculating means 32*a-c* can be configured to execute an algorithm for a forward error correction (FEC). Correspondingly calculated symbols or bits can be combined with the source signal 34*a*, 34*b* or 34*c* by the calculating means 32*a-c* in order to obtain the respective data signals 16*a*, 16*b* or 16*c*. The calculating means 32*a-c* can be embodied, e.g., as a processor, a field programmable gate array (FPGA), a digital circuit on an integrated circuitry or the like and can be configured to continuously or discontinuously receive the source signals 34*a*, 34*b* or 34*c*. The calculating means 32*a-c* can already receive the respective source signal 34*a-c* as a block to be processed and can continuously or discontinuously receive data until a corresponding block size is reached, and can provide the data signals 16*a*, 16*b* or 16*c*, respectively, based on a process block.

For example, combining can occur by adding or inserting the redundancy information (symbols or bits) to or into the resource signal 34*a-c*. A combination of the source signals 34*a-c* by redundancy information enables increased transfer reliability in a transfer system since bit errors can be corrected.

The transmitting means 20 further includes a calculating means 35, e.g. a processor or the like, configured to adjust the IIR filters 28*a-c*, i.e., to calculate and/or to adapt filter coefficients of the IIR filters 28*a-c*. Furthermore, the calculating means 35 can be configured to influence a signal to be applied to the respective filter 28*a-c*, i.e., to add and/or to remove or to suppress signal portions. For example, the calculating means 35 can be configured to remove data of the filtered data signals 18*a-c*, which is considered invalid. The calculating means 35 can be further configured to calculate a system or impulse response of the IIR filters 28*a-c*, e.g., upon applying the reference signal 26*a-c* at the IIR filters 28*a-c*. Alternatively, the system or impulse answer can be calculated on the receiving means side, e.g., by calculating a combined filter-impulse response, e.g., after an error correction has been carried out, and based on filtering the obtained error corrected signal. The calculating means 35 can be configured to store correspondingly obtained and sent filter coefficients and to possibly update the same in a time-varying manner, and to adjust the IIR filters 28*a-c* based on the coefficients. Digital filters with a known structure are sufficiently defined by their coefficients. If the coefficients are known, the impulse response can also be considered as known.

The reference signals 26*a-c* can be adapted to the respective source signal 34*a-c* or data signal 16*a-c* for further enhancement of the transfer reliability. Thus, the reference signals 26*a-c* can comprise a degree of modulation which is lower than a degree of modulation of the source signals 34*a-c* or data signals 16*a-c*. For example, the source signal 34*a* and/or the data signal 16*a* can be modulated by means of a pulse-amplitude modulation (PAM) or by means of a pulse-code modulation (PCM) and comprise a first number of possible amplitude levels such as 3, 4, 5 or more. The reference signal 26*a-c* can also comprise a PAM or PCM modulation and a second number of possible amplitude levels such as 2, 3, 4 or more, wherein the second number of possible amplitude levels is lower than the first number of amplitude levels. When compared to the data signal 16*a* or the source signal 34*a*, the lower degree of modulation of the reference signal 26*a* enables an increase of the interference reliability with regard to transfer errors for the signal portions of the reference signals 26*a-c* in the output signal 12. A signal power of the preamble, i.e., of the reference signal, can be the same as a (mean) signal power of the respective data signal 16*a*, 16*b* or 16*c* in a tolerance range of at most plus/minus 20%, alternatively at most plus/minus 10% or alternatively at most plus/minus 5%. Furthermore, the reference signals 26*a-c* can be configured without a mean value in order to keep the output signal 12 also without a mean value when the data signal 16 is without a mean value. Alternatively, the reference signal 26*a-c* can comprise a mean value in order to compensate a mean value of the data signal 16*a-c* or to obtain the filtered data signal 18*a-c* with a reduced amount of a mean value thereof. Alternatively, the reference signal 18*a-c* can or cannot comprise a mean value regardless of the data signal 16*a-c* comprising a mean value or not. A configuration of the reference signals 26*a-c* without a mean value enables an improved processability of the resulting output signal 12 in analog front ends, i.e., elements such as digital-to-analog converters (DAC) and/or analog-to-digital converters (ADC). This can be an important design criterion.

The reference signals 26*a-c* can also be referred to as preamble, in particular, when the same are placed in front of a block of the data signal 16*a*, 16*b* and 16*c*, respectively, or are appended to the same. Appended reference signals 16*a-c* act on a subsequent block of the data signal 16*a-c* equally or comparably to a signal placed in front of. The preamble can be used as a limiting marker of the respective data blocks (frames) in the continuous data stream (output signal 12).

This enables the marker to be used in the receiving means for synchronizing these frames, e.g. to parallelized data processing chains. The system-wide known preamble enables independent processing of the input data, which subsequently seamlessly fit to each other in the serial transfer, i.e., appearing as if processed in a single serial chain. A communication link between the transmitting means and receiving means can thereby transfer a high payload data load with only a minimal load of "management data" which can be used very efficiently, for example for synchronization and/or training of the parallelizations on the transmitting means and receiving means sides.

A payload data load can be increased or maximized when the data of the different data sources is transmitted in multiples of FEC block sizes, that is, the payload data load of an FEC block is fully utilized. Due to the independence of the parallel data processing of the filter structures 14a-c or 14'a-c, an independent data source may be handled. The data sources can be independent of time. The incoming data stream of a data source (source signal 34c-c) can be configured in a continuous manner and alternatively in a discontinuous manner. The composition of a continuous stream can occur after the signal processing in the serializing, i.e., by means of the multiplexer 22. In contrast to the conventional technology, in which the data for serial transfer are reorganized (multiplexed) and then the signal processing is carried out, due to the preceding embodiments, the signal processing for the transfer can occur on a subset of the data stream and parallel to other independently operating signal processing chains and the reorganizing of the data for the serial link can take place after processing in the filter structures 14a-c or 14'a-c. Despite this shift of the "multiplexing operation" to after the signal processing, the transmission sequence (output signal 12) appears on the channel as a single continuously processed signal. Thus, embodiments enable utilizing a maximum proportion of payload data.

Figure 3:
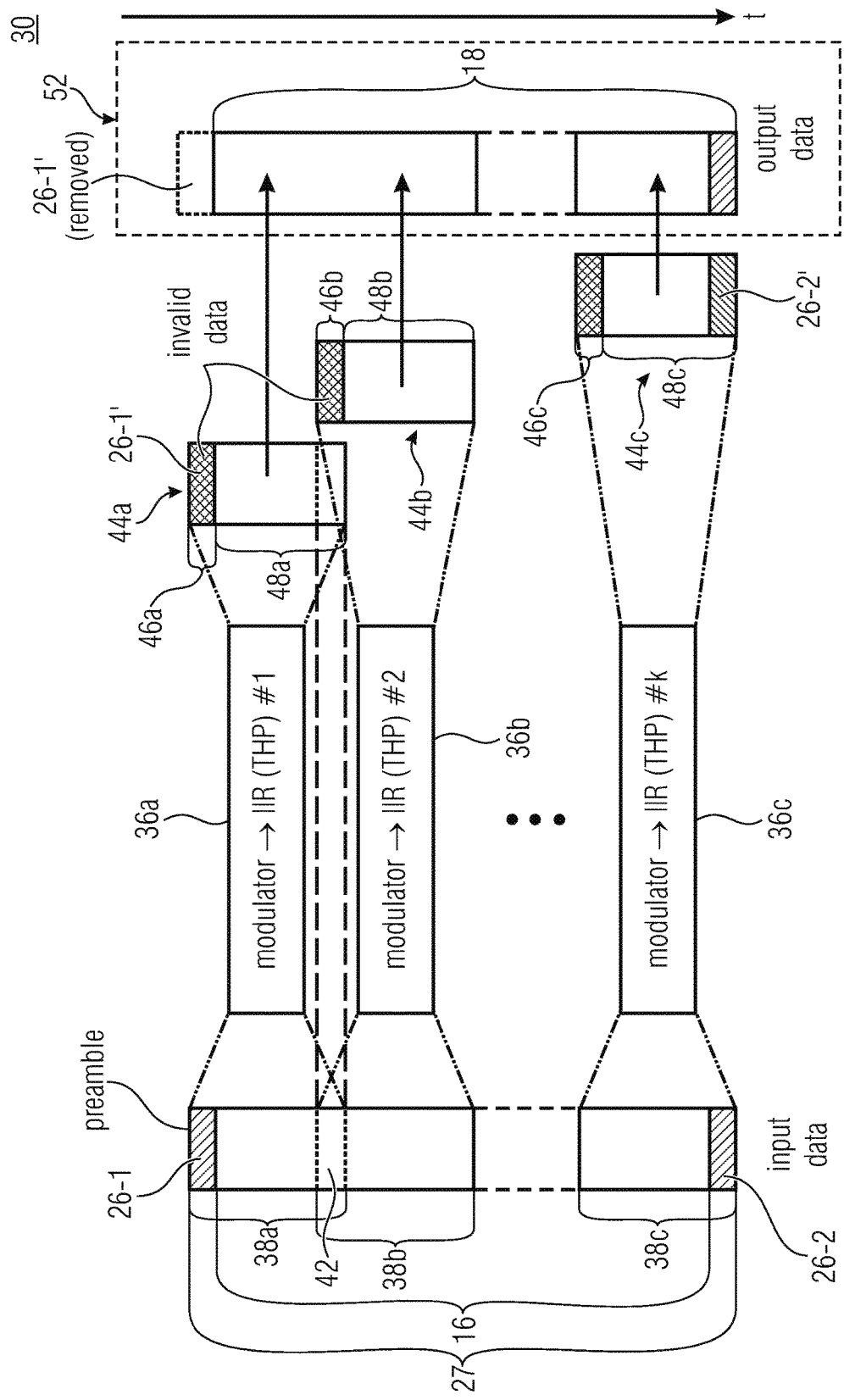
FIG. 3 shows a schematic block circuit diagram of a feedback filter according to an embodiment, which can be arranged, e.g., as an IIR filter in the transmitting means of FIG. 1 or 2.

FIG. 3 shows a schematic block circuit diagram of a feedback filter 30 which can be arranged, for example, as an IIR filter 28a, 28b or 28c in the transmitting means 10 or 20. A sequential series of the signal portions or the extended data signal 27 and the filtered data signal 18 is represented by the time axis t. The extended data signal 27 includes the reference signals 26-1 and 26-2 placed in front of or placed after the data signal 16, according to the statements with respect to FIG. 1b. A further block of the data signal 16 (with the allocated reference signal) can follow the reference signal 26-2 (preamble). The feedback filter 30 includes a plurality, i.e., two, three or more, of IIR filters 36a-c respectively configured to filter one signal portion of the extended data signal 27, which means that the extended data signal 27 is filtered by a parallelized structure of IIR filters 36a-c.

The IIR filters 36a-c are configured to each filter a signal section 38a, 38b and 38c, respectively, of the extended data signal 27 and can be embodied as a THP filter. The signal portions 38a and 38b overlap in an overlapping portion 42, which means that the overlapping portion 42 of the extended data signal 27 is filtered both by the IIR filter 36a at the end of the signal portion 38a as well as by the IIR filter 36b at the beginning of the signal portion 38b. An overlapping portion 42 is arranged between two respective subsequent signal portions 38a-c.

Since the system response of the respective IIR filter 36a-c is dependent on a preceding signal wave form of a certain time duration until the feedback of the preceding signal portions is attenuated to a negligible portion, filtered signal portions 44a, 44b or 44c, respectively, of the IIR filters 36a-c are also dependent on preceding signal components. This can result in the filtered signal portions 44a-c comprising an initial data sequence 46a, 46b and 46c, respectively, which was filtered by a filter in a non-steady state (or a state which is influenced by a not currently filtered block of the respective extended data signal 27). Non-steady state refers to a theoretical state that would be obtained if the extended data signal 27 were continuously filtered by a single IIR filter. Based on the parallelization of the single IIR filter into several subfilters 36a-c, the filters 36a-c are not influenced by signal wave forms of the extended data signal 27, which are arranged temporally in front of the respective signal portion 38a, 38b or 38c, and in this regard therefore in a non-steady state at the beginning of the signal portions 38a-c and the signal portion 44a-c-in portions 46a-c. In these non-steady states, the system response of the filter is different to a significant extent from a system response of a single filter filtering the entire data block so that this data such as the filtered reference signal 26-1' can be considered "invalid". The signal former 52 is configured to remove data 46a-c considered invalid and, thus, also the filter response in response to the preamble 26-1 so that the filtered data signal 18 does not include this filter response in the state shown.

In simplified terms, data of the overlapping portion 42 is correctly filtered by the IIR filter 36a and incorrectly filtered by the IIR filter 36b and is used for the IIR filter 36b as a training sequence in order to obtain the steady state. A system response of the filters 36a-c in the respective training sequence can be considered invalid data and is removed by the signal former 52.

The IIR filters 36a-c are configured such that the overlapping portions 42 comprise a length at least corresponding to a length which the respective IIR filter 36a, 36b or 36c may use in order to reach the steady state. This means that, after the overlapping portion 42, the respective IIR filter 36a-c is influenced by preceding signal portions of the extended data signal 27 such that the filtered signal portion 44a-c is the same in portions 48a-c in a tolerance range as if the extended data signal 27 were filtered by a single IIR filter. The portions 48a-c form the filtered data signal 18 in portions.

The feedback filter structure 30 includes a signal former 52 configured to combine the filtered signal portions 44a-c, e.g., in a sequential successive manner, in order to obtain the filtered data signal 18. The signal former 52 is configured to remove data sequences considered invalid, i.e., the overlapping sequences 46a-c allocated to the overlapping portions 42, and to join the signal portions 48a-c. This enables that the filtered data signal 18 solely comprises such signals or signal sequences that were obtained by filters in a steady state.

When the preamble does not change over several blocks of the extended data signal 27, the preamble 26-2 can be transferred in the filtered block of the output signal 18. Alternatively or additionally, the signal former 52 can be configured to place a system response of the steady-state IIR filter 36a based on the preamble 26-1 in front of the filtered output signal 18 or to insert the same at a different predefined location, e.g., by a shifting operation or the like. Since the preamble 26-1 or 26-2 is known system-wide and the filter structure as well as the coefficients of the IIR filter 36a are also known, a system response of the IIR filter 36a in response to the preamble 26-1 can be calculated.

Alternatively or additionally, the signal former 52 or a further calculating means such as the calculating means 35 can be configured to adjust the IIR filter 36a to a (steady)

state which is obtained when the IIR filter 36a filters the preamble 26-1. The IIR filter 36a can be configured to filter the signal portion 38a to an extent which does not comprise the preamble 26-1 (shortened signal portion 38a). In simplified terms, the system response of the filter 36a can be synthesized in response to the preamble 26-1 since all the parameters (signal and filter structure) are known. This enables the filter 36a to not have to filter (calculate) the preamble 26-1 so that the corresponding energy may be saved and a power dissipation due to the filtering may be avoided.

A length of the overlapping portions 42 refers to a number of symbols of the extended data signal 27, a number of bits thereof and/or a filter length (number of filter taps and/or feedback paths) of the filter. The length of the overlapping portions 42 can be chosen such that it comprises a (training) length which is longer than a memory depth or a coefficient number of the IIR filters 36a-c. An increase of the overlapping portion 42 leads to a decrease of the IIR errors obtained by the parallelization. With a sufficiently large overlap, i.e., length of the training sequence and the overlapping portion 42, such errors can be reduced to acceptable and negligible values, e.g., to values that are below the noise of the transfer or the quantization in the system.

On the other hand, an increase in the length of the overlapping portion 42 leads to less usable (valid) output data for each filter 36a-c per unit of time and, thereby, forces more parallel filters 36a-c in order to keep the time for calculating a block of the filtered data signal 18 the same. Thus, a balance between reducing the errors of the parallelization and the complexity of the implementation can be provided.

When the IIR filters 28a-c are embodied as THP filters in the transmitting means 10 and/or 20, the IIR filters 36a-c can also be embodied as THP filters in their entirety or in part, while the IIR filters 36a-c may be configured equal with regard to the filter structure.

Compared to the parallelization of the signal processing chains in the transmitting means 10 and 20, as illustrated in FIGS. 1 and 2, the IIR filter 30 comprises a parallelized structure of the filter itself. The parallelization in the transmitting means 10 and 20 can be referred to as external parallelization or parallelization level I. On the other hand, the parallelization in the individual IIR filters can be referred to as internal parallelization or parallelization level II. Thus, an obtained data length of the filtered data signal 18 can be unchanged with respect to the extended data signal 27. The reference signal 26-1 (preamble) can comprise a length corresponding to a length of the overlapping portion 42.

The internal parallelization enables a fast and efficient filtering of the respective extended data signals. When having the same filter quality, the individual (sub-) filters 36a-c can comprise a lower complexity (less filter coefficients or calculating operations) compared to a non-parallelized pipelining filter structure.

Although the filter structure 30 has been described such that the extended data signal 27 is filtered, other signals can be applied to the filter structure 30, i.e., be filtered, e.g., signals received from a receiving means, as discussed below.

The concept of parallelization described with reference to the filter structure 30 is also applicable to FIR filters (feedforward filters). These can be brought into a steady state (trained) by means of the overlapping portions 42 and/or the reference signal 26-1 and/or 26-2 in order to subsequently combine the obtained filtered subsignals and to obtain a monolithic signal.

In other words, the systematically present error in the IIR (due to the memory of the feedback) is reduced to values accepted in the transfer system by a longer overlapping/training sequence 42, e.g., longer than the memory depth/coefficient number of the THP. Wth the correct choice of training length, the error values are below the noise by the transfer or the quantization in the system and, thus, practically do not restrict the accuracy of the filter compared to a non-parallelized but quantized filter. By means of this adapted method, which can also be referred to as Memory-Train-Save, the impulse response of the parallelized IIR 30 appears again as a jointly calculated signal. Instead of supplying the first filter element with zeros beforehand, as with the Overlap-Save method known for FIR filters, in Memory-Train-Save, the training sequence is a system-wide known preamble at the beginning and the end, i.e., a first and a last filter in the internal parallelization level II. As a result, the data segments of the external parallelization level I can also be joined and the entire system appears as a jointly calculated wave form. Calculating the preamble filtering is practically not required for the first filter element (IIR-filter 36a). Resetting the memory in the IIR/THP filter to the values obtained by calculating the preamble can occur. This results in less power dissipation in the filter.

Figure 4:
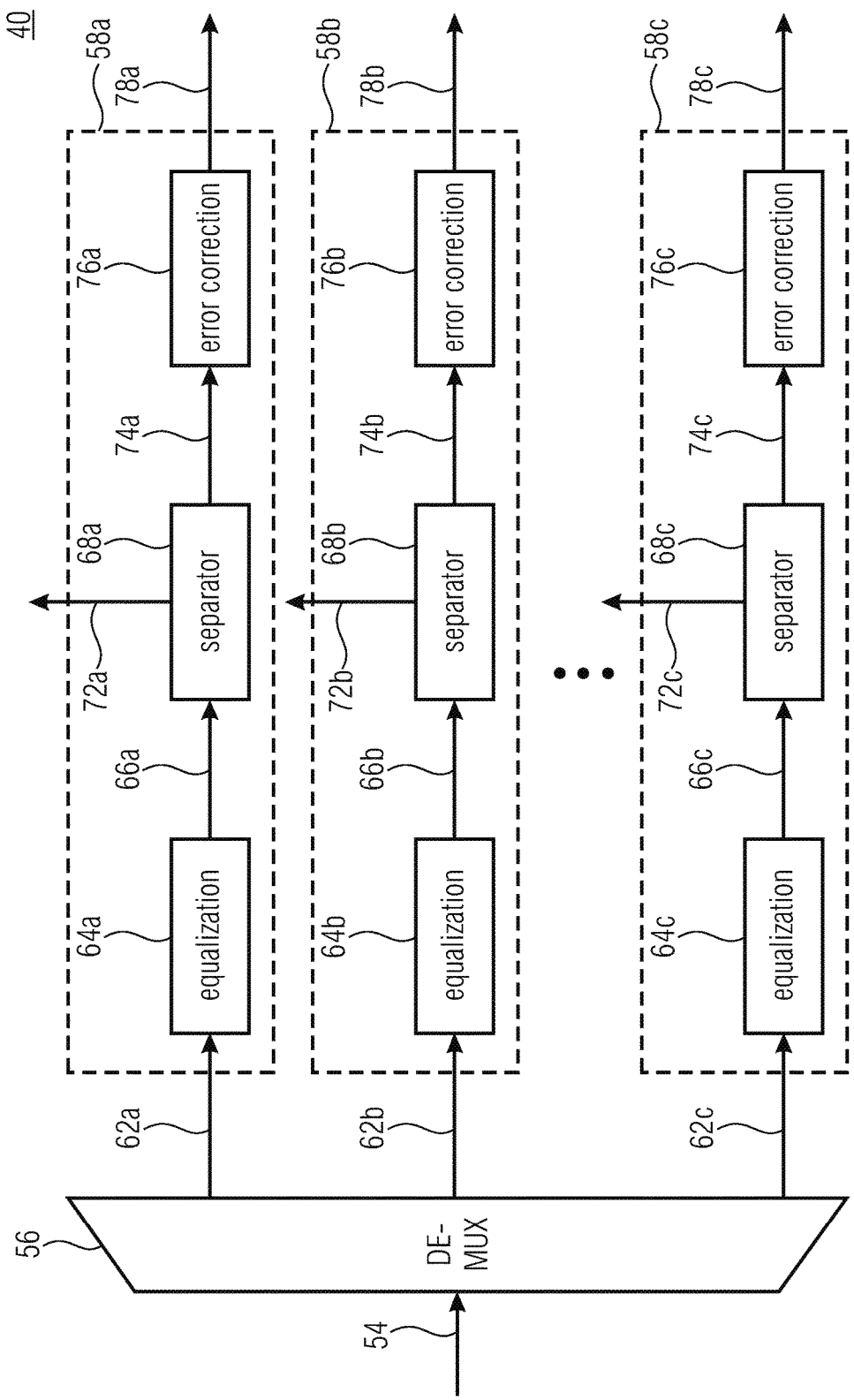
FIG. 4 shows a schematic block circuit diagram of a receiving means for receiving an output signal transmitted by a transmitting means according to an embodiment.

FIG. 4 shows a schematic block circuit diagram of a receiving means 40 for receiving an output signal 54 transmitted by a transmitting means. For example, the output signal 54 can be the output signal 12 of the transmitting means 10 or 20, which is received via a transfer medium such as a line or a radio medium. Alternatively, the output signal 54 can also be a different output signal such as from a transmitting means according to the conventional technology since the output signal 12 appears as if calculated by a single signal processing chain (conventional technology), as discussed above. Although the output signal 12 comprises the added reference signals, these can also be considered as a periodically repeating header of a data block and/or be extracted or ignored.

The receiving means 40 includes a demultiplexer 56 and two or more receiving structures 58a-c. For example, three receiving structures 58a-c are illustrated in FIG. 4, while it is indicated by the dots between the receiving structure 58b and 58c that the receiving means 40 can also comprise several receiving structures. Alternatively, the receiving means 40 can also merely comprise two receiving structures.

The demultiplexer 56 is configured to generate a receiving signal 62a, 62b and 62c, respectively, for each receiving structure 58a-c or for data sinks to which the data is forwarded. For example, the receiving structures 58a-c are allocated to a data sink, i.e., a receiving means or a processor of the data, so that the demultiplexer 56 is, for example, configured to divide the output signal 54 into the receiving signals 62a-c allocated to the respective data sinks.

The parallelized arrangement of the receiving structures 58a-c enables a parallelized decoding and/or equalization of the respective receiving signals 62a-c. This enables a high data throughput and a low complexity of the employed filters. In particular, the receiving signals 62a-c can be equalized and/or decoded independently and/or differently from each other.

The receiving structures 58a-c each include an equalization filter 64a, 64b and 64c, respectively, for equalizing the receiving signal 62a, 62b and 62c, respectively. The equalization filters 64a, 64b and/or 64c can be embodied, e.g., as a forwardly directed equalization (Feed Forward Equalizer—FFE).

An equalized receiving signal 66a, 66b and 66c obtained in such a way is received by a separator 68a, 68b and 68c, respectively. The separator 68a, 68b and 68c is configured to possibly separate, i.e., to detect and to evaluate, a reference signal 72a, 72b and 72c, respectively, or to remove the reference signal 72a-c from the equalized receiving signal 66a-c. For example, the reference signal 72a-c can be the reference signal 26a-c. For example, the separator 68a-c can be configured to determine a beginning or start of a data block in the equalized receiving signal 66a-c. For example, a content of the respective reference signal 72a-c is known to the separator 68a-c so that, based on a comparing operation such as a cross-correlation of the equalized receiving signal 66a-c with the reference signal, the latter can be detected. One or several separators 68a-c can be coupled to the demultiplexer 56 so that the same receives information from the one or the several separators 68a-c in regard to the location in the output signal 12 at which the reference signal is received or contained. The multiplexer 56 can be configured to influence, based on this information, a division of the output signal 12 into the receiving signals 66a-c, i.e., to (correctly) synchronize the same.

According to embodiments, information with regard to a data block size of the equalized receiving signals 66a-c in the respective separator 72a-c is known so that the same can determine, based on a time measurement between two reference signals in the equalized receiving signal 66a-c, an estimation with respect to a frequency offset. For example, this can be done by means of a control which checks the distances (for example in symbol clocks) of the found reference signals (preambles). The separator 68a-c can be further configured to carry out a frequency synchronization and phase synchronization of the symbol clock in the receiving means onto the output signal 54 and/or the receiving signals 66a-c. For this purpose, the separator 68a-c can comprise corresponding filters for the synchronization error detection (timing error detector). Alternatively or additionally, the separator 68a-c of a receiving structure 58a-c can be configured to remove the respective reference signal 72a-c from the equalized receiving signal 66a, 66b and 66c, respectively, and/or to provide the reference signal 72a-c to a further calculating means for determining the preceding information.

Alternatively, the coarse and fine frequency synchronization and phase synchronization can be included in one separator only, i.e., be carried out, which handles this task globally. According to a further embodiment, this function is implemented in an additional parallel path with an equalization filter and a separator, which only evaluates a subset of the data so as to consume a small amount of power.

In simplified terms, the separator 68a-c or a calculating means can be configured to determine a temporal spacing of the reference information in the respective receiving signal and to determine phase correction information based on a temporal distance or to provide the reference information 72a-c to a calculating means, which carries out the corresponding determination of the temporal distance as well as of the phase correction information.

The separators 68a, 68b and 68c are configured to provide an output signal 74a, 74b and 74c, respectively, corresponding to the equalized receiving signal 66a, 66b and 66c, respectively, or a version thereof which is separated from the reference signal 72a, 72b and 72c, respectively, to a calculating means 76a, 76b and 76c, respectively, of the receiving structures 58a, 58b and 58c, respectively, The calculating means 76a-c are configured to carry out an error correction based on redundancy information contained in the signals 74a-c, e.g., based on an FEC in the transmitting means 10 or 20, and to provide a data signal 78a-c which can be forwarded to one or several data sinks.

Thus, the receiving means 40 enables a parallelization of the receiving structure of a transfer system.

Figure 5:
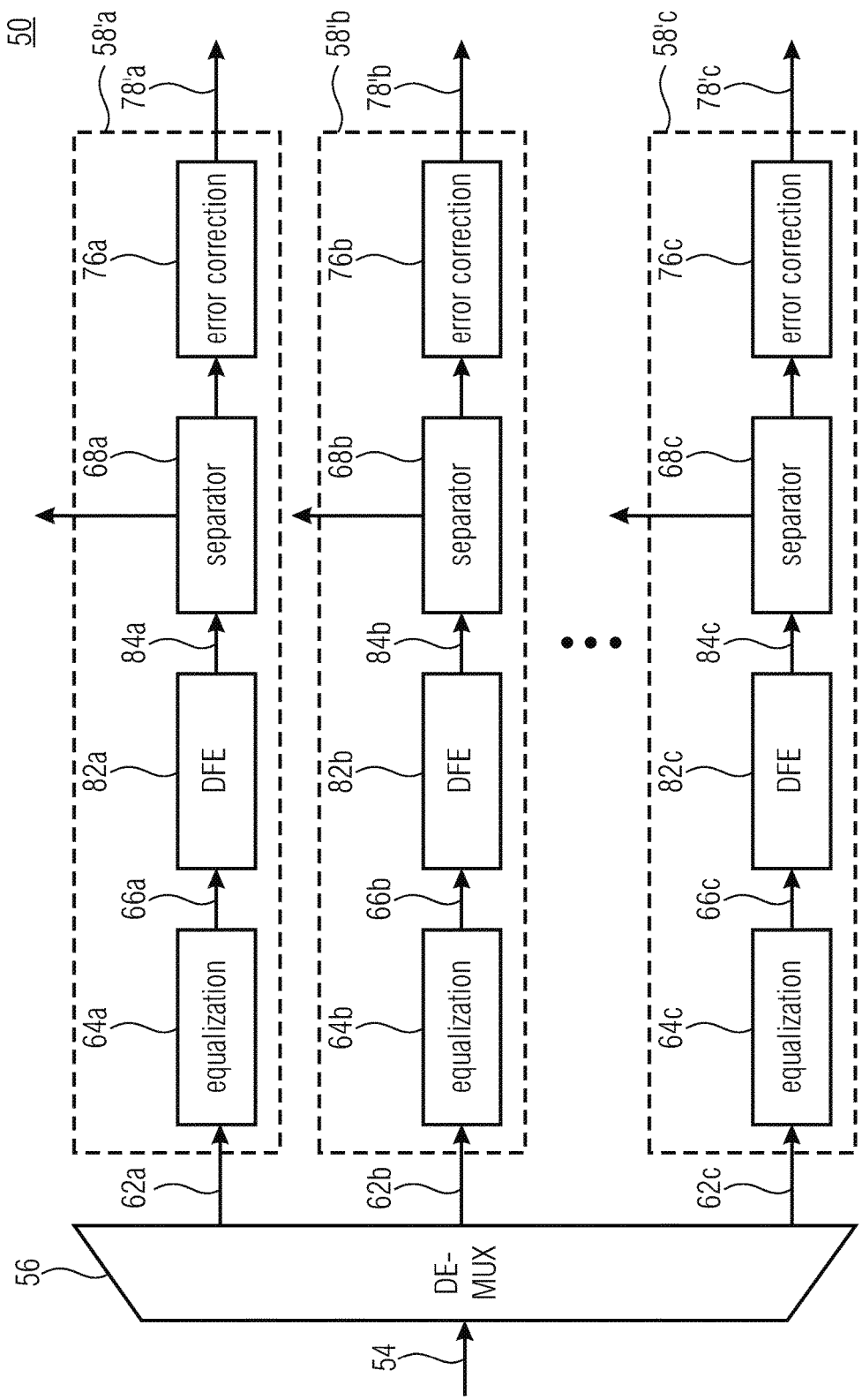
FIG. 5 shows a schematic block circuit diagram of a receiving means which comprises receiving structures that are modified compared to receiving structures of the receiving means of FIG. 4 according to a further embodiment.

FIG. 5 shows a schematic block circuit diagram of a receiving means 50 according to a further embodiment. Compared to the receiving means 40, the receiving means 50 comprises, in modified receiving structures 58'a-c, an equalization filter 82a, 82b and 82c, respectively, which is embodied as a decision feedback equalizer (DFE) filter and arranged between the equalization filters 64a, 64b and 64c, respectively, which are embodied as FIR filters, and the separators 68a, 68b and 68c, respectively. The DFE filters 82a-c comprise an IIR structure. The DFE filters 82a-c are embodied as parallelized IIR filters, as described for the IIR filter 30 in FIG. 3, i.e., the DFE filters 82a-c comprise a plurality of parallelized (sub) IIR filters 36a-c. The DFE filters 82a-c are configured to filter the equalized signal 66a, 66b or 66c and to output a correspondingly filtered equalized signal 84a, 84b and 84c, respectively, and to provide the same to the separator 68a, 68b and 68c, respectively. The receiving structures 58'a-c are configured to output a modified data signal 78'a-c compared to the data signals 78a-c, which is influenced by the additional equalization.

The additional arrangement of the DFE filters 82a-c enables an adaption to time-varying characteristics of a transfer channel via which the output signal 54 is received. A parallelization by the parallelization level II of these IIR filters allows for a high number of parallelized filter operations.

Figure 6:
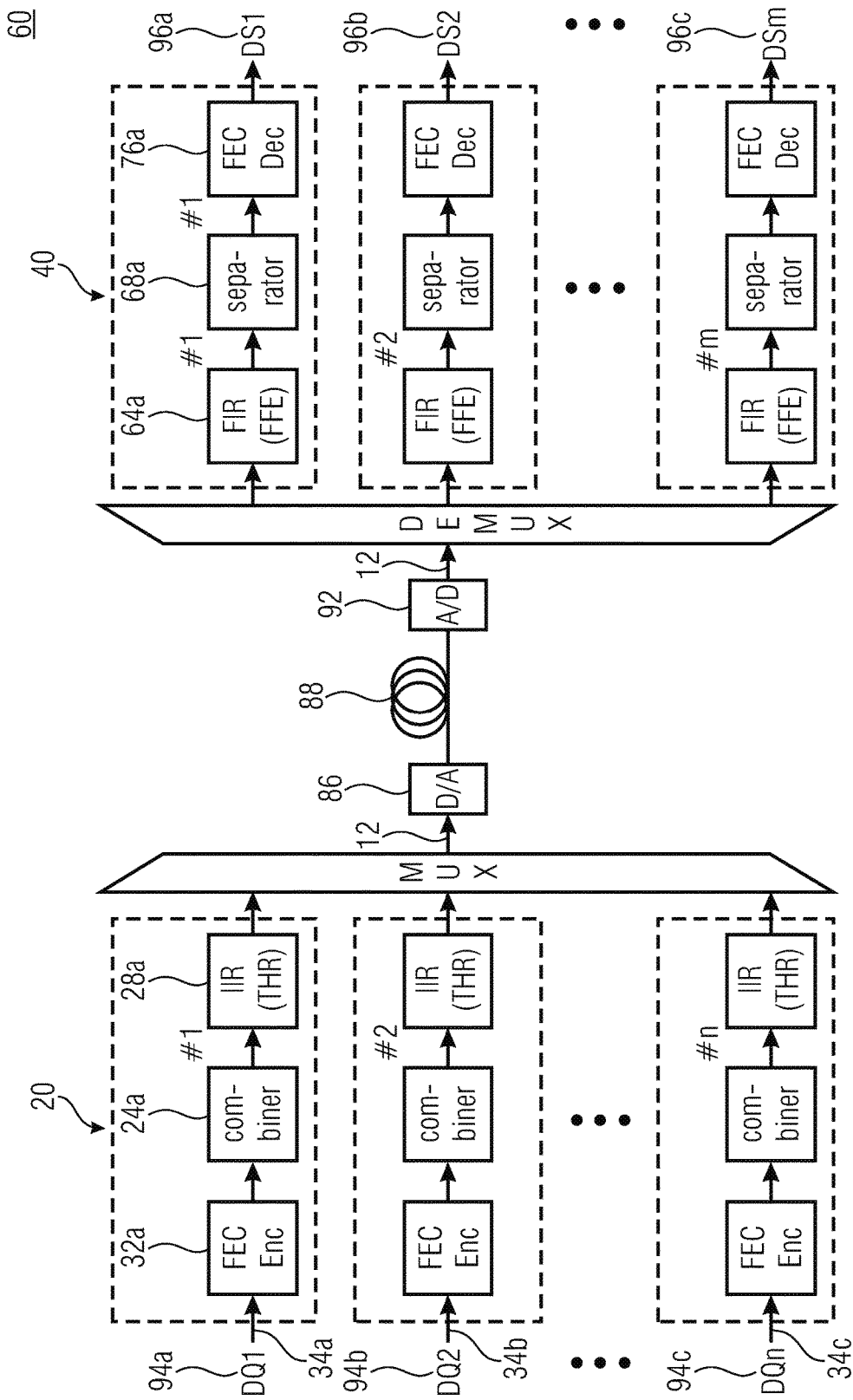
FIG. 6 shows a schematic block circuit diagram of a transfer system which includes the transmitting means of FIG. 2 and the receiving means of FIG. 4 according to an embodiment.

FIG. 6 shows a schematic block circuit diagram of a transfer system 60 including the transmitting means 20 and the receiving means 40. Alternatively, the transfer system 60 can also include the transmitting means 10 and/or the receiving means 50. The transfer system 60 further includes a digital-to-analog converter (D/A) 86 configured to convert the output signal 12 to an analog signal so that the output signal can be transmitted with a corresponding signal power. The transfer system 60 includes a transfer channel 88 and an analog-to-digital converter (A/D) 92 configured to receive the output signal 12 transferred via the transfer channel 88 and to digitalize the same for further processing.

The transmitting means 20 includes a first number n of data sources. The receiving means 40 includes a second number m of data sinks. The first number n and the second number m each comprise a value of ≥2 and can comprise a same value. This means that, for example, a data source 94a-c provides or generates a source signal 34a, 34b and 34c, respectively, which is allocated to a data sink 96a-c, which can also be described as a 1:1 connection. Alternatively, a data source signal 34a, 34b and/or 34c can be allocated to at least two data sinks 96a, 96b and 96c, which allows for a number of n<m and can be referred to as a 1:x connection. Alternatively or additionally, several data sources 94a-c can each provide a data stream 34a-c respectively allocated to a data sink 96a-c and enabling a number of n>m, which can also be described as x:1 connection. Furthermore, mixed forms of data transfer are possible, such as n:m connections with n being unequal m, such as 3:2 or 2:3. For example, this can arise due to a configuration of the data sources or data sinks, but also simply due to a different parallelization for the same calculating throughput. In other words, in the transfer system 60, the channel encoding and predistortion do not occur in the multiplexed serial data stream but a framing of the data is already performed before the multiplexer in order to correctly allocate the data in the receiving means for the blockwise decoding. A nested parallelization is employed in the data processing. There is an external parallelization level I at the FEC blocks and an internal parallelization level II in each of the FEC blocks.

Figure 7:
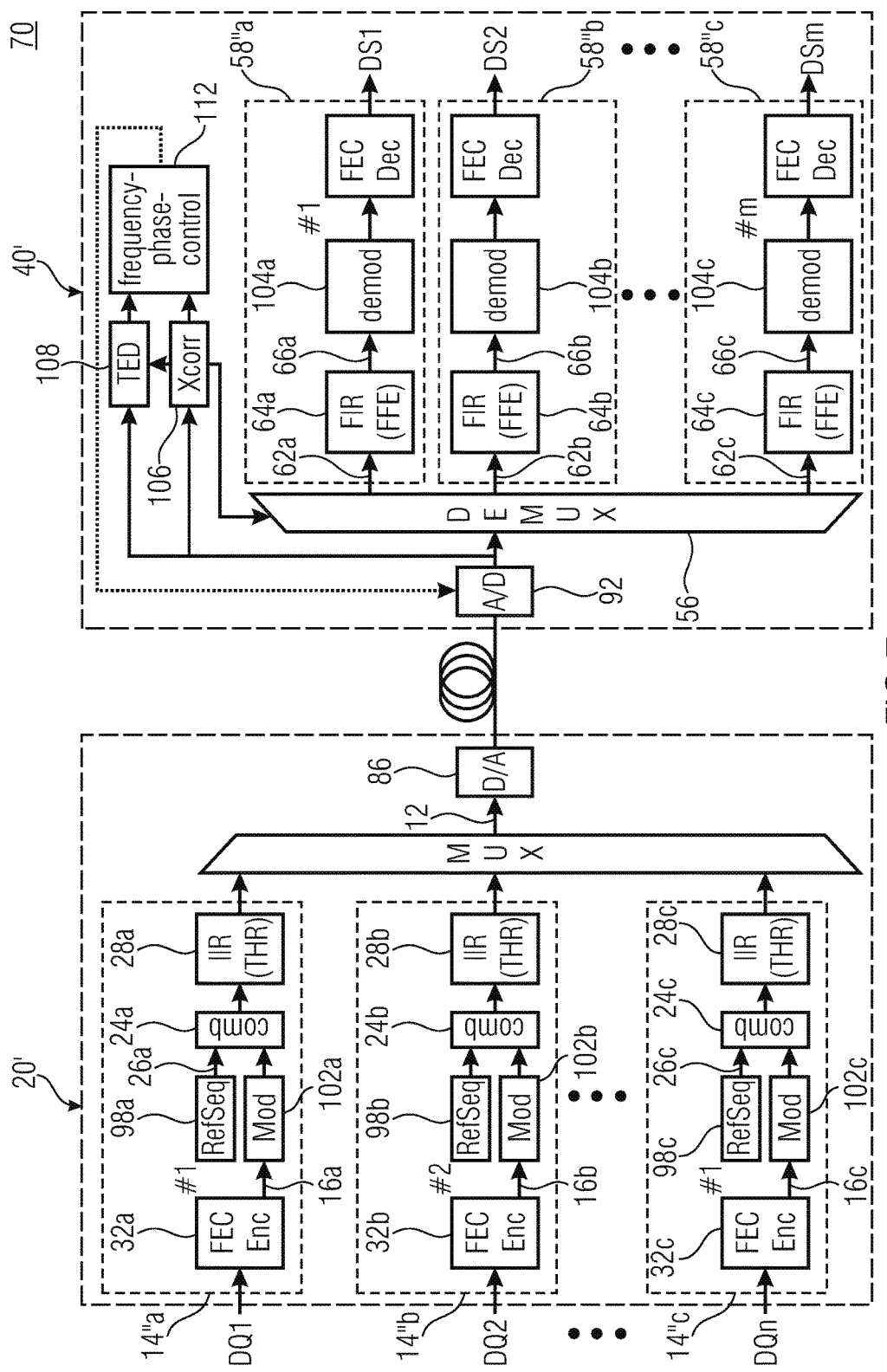
FIG. 7 shows a schematic block diagram of an alternative transfer system, in which the transmitting means includes modulators for modulating the data signals, and the receiving means includes demodulators as well as a means for synchronization.
Figure 8:
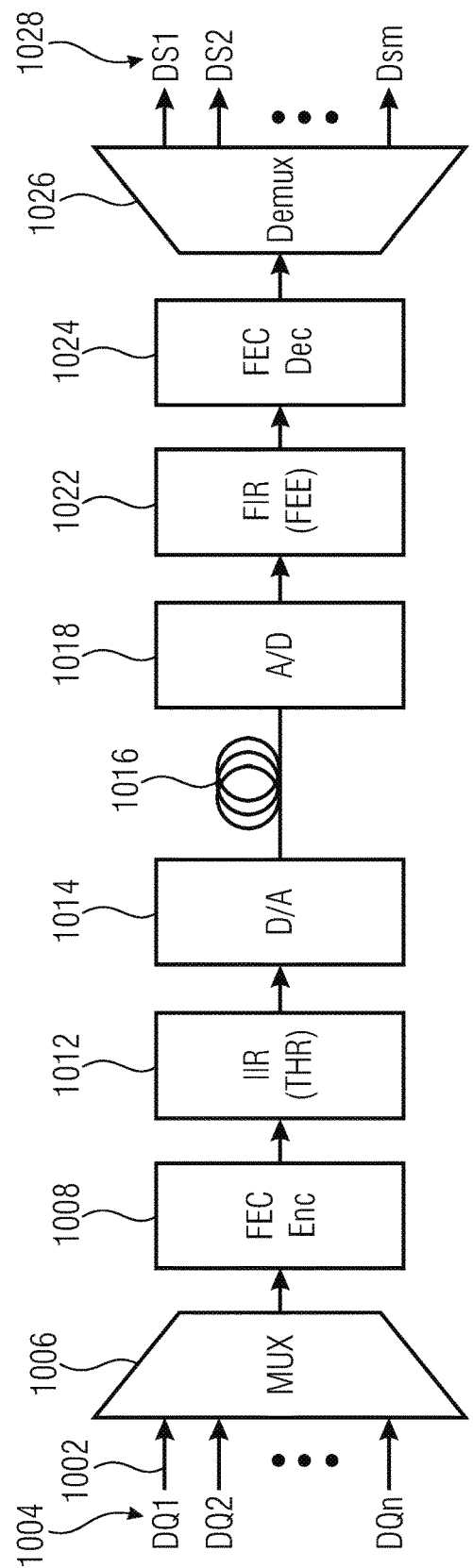
FIG. 8 shows a transfer system according to the conventional technology.

FIG. 7 shows a schematic block circuit diagram of a transfer system 70 including, compared to the transmitting means 20, a modified transmitting means 20' and, compared to the receiving means 40, a modified receiving means 40'. The transmitting means 20' includes the D/A converter 86. Compared to the transmitting means 20, the transmitting means 20' is further modified in such a way that the filter structures 14"$a$-$c$ each include a signal memory 98$a$-$c$ configured to store or to generate the respective reference signal 26$a$-$c$ and to provide the reference signal 26$a$-$c$ to the respective combiner 24$a$-$c$. The combiners 24$a$-$c$ can be configured to scale the reference signal 26$a$-$c$ before inserting the same into the extended data signal. The signal memory 98$a$-$c$ can be any volatile or non-volatile memory such as a RAM, ROM, (E)EPROM, FLASH or the like. Alternatively, instead of the signal memory 98$a$-$c$, a signal generator may be arranged to generate the reference signal 26$a$-$c$.

The filter structures 14"$a$-$c$ further each include a modulator 102$a$-$c$ arranged between the respective redundancy block 32$a$-$c$ and the respective combiner 24$a$-$c$ and configured to modulate the data signal 16$a$-$c$ with a modulation degree, for example, with modulation of a frequency, a phase and/or an amplitude. For example, one or several modulators 102$a$-$c$ can be configured to modulate the respective data signal 16$a$-$c$ with a PAM or PCM having a modulation degree of 2, 3, 4, 5, 6, 7, 8 or more levels. The respective reference signal 16$a$-$c$ can be obtained from the respective signal memory 98$a$-$c$ with a modulation degree which is lower than the modulation degree of the modulator 102$a$-$c$ in order to obtain an increased interference reliability of the output signal 12 with respect to the reference signals 26$a$-$c$ and with respect to the data signals 16$a$-$c$.

The receiving means 40' includes the A/D converter 92. Receiving structures 58"$a$-$c$ of the receiving means 40' which are modified compared to the receiving structures 58 and 58' comprise a demodulator 104$a$, 104$b$ and 104$c$, respectively, configured to demodulate the equalized signal 66$a$-$c$ based on the degree or method of modulation of the modulators 102$a$-$c$. The demodulators 104$a$-$c$ can be integrated into the separators 68$a$-$c$, can include them or replace.

The receiving structure 40' further includes a cross-correlator 106 configured to determine the reference signal by means of a cross-correlation in a digitalized output signal obtained by the A/D converter 92, i.e., a data sequence of the output signal comprising the reference signal in a filtered form. A result of the cross-correlation can, for example, be provided in a digital signal or a voltage signal or a current signal, wherein the amplitude of the same indicates a measurement of the correlation (correspondence) of the received and the deposited (expected) reference signal. The cross-correlator 106 is configured to supply information with respect to the position of the reference signal in the output signal 12 to the demultiplexer 56 so that, by means of the demultiplexer 56, a correct division of the output signal 12 into the receiving signals 62$a$-$c$ or of the reference signal and the FEC blocks to the filterbanks (receiving structures 58"$a$-$c$) can be carried out and/or an erroneous division can be corrected. This division is called block synchronization or frame synchronization. In this case, the cross-correlator 106 can include a copy of a filter 64 and/or a separate filter for extracting the time error.

The receiving structure 40' further includes a timing error detector 108 (TED) configured to compare the (known or deposited) reference signal and the received reference signal with each other, and to determine a time offset (timing error) of the receiving reference signal with respect to the deposited reference signal. For example, the timing error detector 108 can be embodied as a equalization-based TED and/or implement a Müller-Müller algorithm, and is configured to output information with respect to the timing offset, e.g., in a digital or an analog signal. The timing error detector 108 can include a copy of a filter 64 and/or a separate filter for extracting the timing error.

The receiving structure 40' further includes a means 112 for determining and/or monitoring the frequency and/or phase of the output signal 12. The means 112 is configured to determine, based on the information obtained by the timing error detector 108 and the cross correlator 106, correction values with respect to a sampling frequency and/or a sampling phase for the A/D converter 92, and to adjust the A/D converter 92 by means of the correction values in order to obtain and/or increase a synchronization of the A/D converter 92 with respect to the output signal 12.

The information of the cross correlator 106 serve for a coarser adjustment of the correction of frequency and/or phase (synchronization of the A/D converter 92) of the receiving means 40' to the transmitting means 20' or the transfer system 70, and the values of the timing error detector 108 serve for a finer adjustment of the same.

The FFE blocks (equalization) 64$a$-$c$ include a modulo operation to enable a correct demodulation of the data signals 16$a$-$c$ filtered by means of the modulo operation in the THP filters 28$a$-$c$. In simplified terms, the received data enter the FIR/FFE, wherein a segment with a filtered reference signal is first. When a THP is active at the transmitting means, which, being a THP, possibly carries out a modulo operation, a modulo operation is calculated advantageously or possibly compulsory before a demodulation and after the FFE at the receiving means. In a receiving means synchronization, the cross correlator 106 (Xcorr) first searches for the preamble (reference sequence). This does not have to occur in the entire data stream but can also be carried out in "snapshots" recorded in distances. This enables reduced speed requirements of the processing of the cross correlator. For example, the cross correlator 106 provides information such as the determined position of the preamble and the height of the correlation peaks over time (i.e., the history of these values for, e.g., 20-100 snapshots). The position of the current preamble serves the demultiplexer 56 in order to correctly divide the data blocks (preamble+FEC block) to the filterbanks.

The receiving means clock may be equal to the baud rate of the transmitting means 20', i.e., there is one sampling value per symbol. An oversampling and its control by means of the frequency phase monitoring unit 112, e.g., two sampling values per symbol, and a digital synchronization through an interpolation filter is possible in order to obtain an increased accuracy, but is (possibly extremely) resource consuming at high targeted clock rates.

Alternatively, the operations of the cross correlator 106, the timing error detector 108 and/or the frequency phase monitoring unit 112 for determining and/or monitoring of the frequency and/or phase of the output signal 12 can entirely or partly be carried out by separator 68$b$.

For the internal parallelization stage II, compensation filters (equalization filters) and a modulator 102$a$-$c$, or a combiner 24$a$-$c$ and a demodulator 104$a$-$c$, or a separator 68$a$-$c$ are parallelized. The preamble (reference signal) also passes through the signal processing at the transmitting means and is transferred for the training of the parallelized compensation filters in the receiving part. In the simplest case, the multiplexer and demultiplexer can operate in a method similar to the "Round Robin", i.e., a frame is transmitted subsequently from each data source and the frames are successively divided to the data sinks in the receiving means. Alternatively, a short info field may be added to the preamble, for example, containing an ID of the data source, an ID of the data sink, a continuous frame number and/or possibly a time stamp. In this way, frames from any data source can be transmitted at the transmitting means as needed, and be easily allocated to the correct data sinks in the receiving means.

The equalization structure of the THP filter on the transmitting means side and FFE on the receiving means side can be efficiently implemented for very high data throughputs.

The embodiments described above enable an application in apparatuses for a baseband transfer, in high speed data transfers, in particular using digital filtering as well as a parallelized digital data processing. Signals of independent data sources may be calculated in parallel and appear in an output signal as a monolithically processed waveform, enabling easy decoding.

The preamble, i.e., the reference signal, is, for example, appended to the respective FEC block and/or placed in front of the same in the transmitting means after the FEC encoder (redundancy block 32a-c). As described in FIG. 3, a preamble placed in front of can also be output at an end of the filtered signal from a filter.

The preamble can be used on the transmitting means side in order to serve as a training sequence for the THP (subfilter) to enable a parallelization (parallelization level I). The preamble can further serve as a training sequence for the FIR filters (equalization 64a-c) in order to enable a parallelization. The preamble is further used to be determined as a marker for a block start or a block end for the FEC (error correction 76a-c). The block start can be found through a correlation with the known preamble. Checking the timing distances (possibly in symbol clocks) of the found preambles can be employed for a coarse frequency offset estimation. Further, the preamble can be used for a fine synchronization of frequency and phase. In this case, timing error detectors can be used as special filters for a more precise control.

The uses mentioned are not exhaustive. Different uses can lead to a different requirement with respect to the length of the preamble. While a comparatively long preamble may be used for determining the blocks start or of a block end and/or a coarse frequency synchronization in order to enable a robust calculation by means of the cross correlation, the length of the preamble may increasingly decrease if a system implementation is merely based on a parallelization of the THP blocks (parallelization level II), a fine synchronization of phase and/or frequency or a parallelization of the FFE blocks (64a-c). The implementation can change with transfer channels 88 different from each other. For example, to detect a start block, a preamble can have a length of, e.g., at least 30, at least 40 or at least 50 symbols.

Previous embodiments can also be realized as software-based filters, in which parallelized filter structures and receiving structures are implemented based on a multitude of computing cores working in parallel.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Generally, embodiments of the present invention may be implemented as a computer program product having a program code, the program code being effective to perform any of the methods when the computer program product runs on a computer.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A transmitter for transmitting an output signal, comprising:
   a first filter structure comprising a first combiner configured to extend a first data signal by a first reference signal in order to acquire a first extended data signal, and comprising a first IIR filter for filtering the first extended data signal in order to acquire a first filtered data signal;
   a second filter structure comprising a second combiner configured to extend a second data signal by a second reference signal in order to acquire a second extended data signal, and comprising a second IIR filter for filtering the second extended data signal in order to acquire a second filtered data signal;
   a multiplexer for combining the first and second filtered data signals in order to acquire the output signal based on the filtered data signals;
   wherein a system response of the first IIR filter based on the first reference signal corresponds to a system response of the second IIR filter based on the second reference signal,
   wherein the first and second combiners are configured to insert the reference signal in front of and after a data block of the data signal, and wherein the IIR filters, the multiplexer or a signal former are configured to reject an acquired filtered reference signal based on the reference signal placed in front of so that the output signal comprises the filtered data signals and the filtered reference signals inserted after the data block and does not comprise the filtered reference signals inserted in front of the data block.

2. The transmitter according to claim 1, wherein the first reference signal and the second reference signal are equal, or wherein the first IIR filter and the second IIR filter comprise an equal filter structure with equal filter coefficients.

3. The transmitter according to claim 1, comprising at least a third filter structure comprising a third combiner configured to extend a third data signal by a third reference signal in order to acquire a third extended data signal, and comprising a third IIR filter for filtering the third extended data signal in order to acquire a third filtered data signal;
   wherein the multiplexer is configured to combine the first, second and at least third filtered data signals in order to acquire the output signal;
   wherein the system response of the first IIR filter based on the first reference signal corresponds to the system response of the second IIR filter based on the second reference signal and to a system response of the third IIR filter based on the third reference signal.

4. The transmitter according to claim 1, wherein the first filter structure comprises a first calculator configured to calculate first redundancy information with regard to a first source signal and to combine the first redundancy information with the first source signal in order to acquire the first data signal, and wherein the second filter structure comprises a second calculator configured to calculate second redundancy information with regard to a second source signal and to combine the second redundancy information with the second source signal in order to acquire the second data signal.

5. The transmitter according to claim 1, wherein the first and/or the second reference signal do not comprise a mean value.

6. The transmitter according to claim 1, wherein the first reference signal comprises a data length which is larger than a length of the first IIR filter by a factor of more than or equal to 3.

7. The transmitter according to claim 1, wherein the first or the second combiner is configured to combine the first or the second reference signal, respectively, with a modulation degree, wherein the modulation degree is lower than a modulation degree with which the first or the second data signal is modulated.

8. The transmitter according to claim 1, wherein the first and second IIR filters comprise:
   a plurality of feedback filters configured to filter a signal portion of the first or the second extended data signal in order to acquire a plurality of filtered signal portions according to the plurality of feedback filters, wherein two successive signal portions partly overlap in an overlapping portion;
   a signal former configured to combine the plurality of filtered signal portions to the filtered data signal and to reject overlapping sequences of the filtered signal portions allocated to the overlapping portion of a first and a second filtered signal portion, wherein the signal former is configured to combine two filtered signal portions of two successive signal portions and to reject an overlapping sequence with the overlapping portion of the second filtered signal portion following the first.

9. The transmitter according to claim 1, wherein the IIR filters of the first and second filter structures are embodied as Tomlinson-Harashima-precoding filters (THP).

10. A transfer system comprising:
    A transmitter according to claim 1;
    A receiver for receiving an output signal, wherein the receiver comprises a demultiplexer;
    Wherein the transmitter and the receiver are coupled via a transfer medium.

11. The transmitter according to claim 8, wherein the overlapping portion corresponds to a length of a data sequence after which the feedback filters have reached a steady state.

12. The transmitter according to claim 8, wherein the filtered data signal comprises a data structure equal to a data structure which would be acquired when a data signal, to which a reference signal is added, is filtered by a single IIR filter.

13. The transmitter according to claim 8, wherein a data length of the first reference signal corresponds to a data length of the overlapping portion, and wherein a calculator is configured to determine a filter state of a feedback filter of the plurality of feedback filters, which can be acquired in response to the first reference signal, to pre-adjust the feedback filter with the filter state and to provide the feedback filter filtering the signal portion comprising the first reference signal with a modified signal portion not comprising the first reference signal.

14. The transmitter according to claim 8 wherein the multiplexer forms a first parallelization level of a signal processing of the first and second data signals, wherein the first IIR filter forms a second parallelization level of the signal processing of the first data signal and wherein the second IIR filter forms a second parallelization level of the signal processing of the second data signal.

15. A receiver for receiving an output signal, comprising:
    a demultiplexer for generating a first and a second receiving signal from the received output signal, wherein the output signal comprises reference signals between data blocks of the output signal, which are a system-wide known preamble;
a first receiving structure comprising a first equalization filter for equalizing the first receiving signal, and comprising a first separator configured to separate a first reference signal from the equalized first receiving signal;
a second receiving structure comprising a second equalization filter for equalizing the second receiving signal, and comprising a second separator configured to separate a second reference signal from the equalized second receiving signal.

16. The receiver according to claim 15, further comprising a calculator configured to calculate a temporal distance of the reference information in the first or the second receiving signal and to determine phase correction information based on the temporal distance.

17. The receiver according to claim 15, wherein the first or the second receiving structure further comprises a feedback filter structure comprising a plurality of feedback filters configured to filter a signal portion of the first or the second equalized receiving signal in order to acquire a plurality of filtered signal portions according to the plurality of feedback filters, wherein two successive signal portions partially overlap in an overlapping portion;
a signal former configured to combine the plurality of filtered signal portions to the filtered data signal and to reject overlapping sequences of the filtered signal portions allocated to the overlapping portion of a first and a second filtered signal portion, wherein the signal former is configured to combine two filtered signal portions of two successive signal portions and to reject an overlapping sequence with the overlapping portion of the second filtered signal portion following the first.

18. The receiver according to claim 15, wherein the first or the second receiving structure further comprises a feedforward filter structure comprising a plurality of feedforward filters configured to filter a signal portion of the first or the second receiving signal in order to acquire a plurality of filtered signal portions according to the plurality of feedforward filters, wherein two successive signal portions partially overlap in an overlapping portion;
a signal former configured to combine the plurality of filtered signal portions to a filtered data signal and to reject overlapping sequences of the filtered signal portions allocated to the overlapping portion of a first and a second filtered signal portion, wherein the signal former is configured to combine two filtered signal portions of two successive signal portions and to reject an overlapping sequence with the overlapping portion of the second filtered signal portion following the first.

19. The receiver according to claim 15, wherein the first receiving structure comprises a first feedback filter structure comprising a plurality of feedback filters, wherein the second receiving structure comprises a second feedback filter structure comprising a plurality of feedback filters, wherein the demultiplexer forms a first parallelization level of a signal processing of the first and second receiving signals, wherein the first feedback filter structure forms a second parallelization level of the signal processing of the first receiving signal and wherein the second feedback filter structure forms a second parallelization level of the signal processing of the second receiving signal.

20. The receiver according to claim 17, wherein the feedback filter structure of a filter path is embodied as decision feedback equalization filter (DFE).

21. A method for transmitting an output signal, comprising:
extending a first data signal by a first reference signal in order to acquire a first extended data signal;
filtering the first extended data signal with a first IIR filter in order to acquire a first filtered data signal;
extending a second data signal by a second reference signal in order to acquire a second extended data signal;
filtering the second extended data signal with a second IIR filter in order to acquire a second filtered data signal;
combining the first and second filtered data signals in order to acquire the output signal based on the filtered data signals;
wherein a system response of the first IIR filter based on the first reference signal corresponds to a system response of the second IIR filter based on the second reference signal,
wherein the reference signal is inserted in front of and after a data block of the data signal, and wherein an acquired filtered reference signal is rejected based on the reference signal placed in front of so that the output signal comprises the filtered data signals and the filtered reference signals inserted after the data block and does not comprise the filtered reference signals inserted in front of the data block.

22. A method for receiving an output signal, comprising:
generating a first and a second receiving signal from the received output signal, wherein the output signal comprises reference signals between data blocks of the output signal, which are a system-wide known preamble;
equalizing the first receiving signal;
separating a first reference signal from the equalized first receiving signal;
equalizing the second receiving signal;
separating a second reference signal from the equalized second receiving signal; and
filtering a signal portion of the first or the second equalized receiving signal with a plurality of feedback filters in order to acquire a plurality of filtered signal portions according to the plurality of feedback filters in such a way that two successive signal portions partially overlap in an overlapping portion;
combining the plurality of filtered signal portions to the filtered data signal and rejecting overlapping sequences of the filtered signal portions allocated to the overlapping portion of a first and a second filtered signal portion; and
combining two filtered signal portions of two successive signal portions and rejecting an overlapping sequence with the overlapping portion of the second filtered signal portion following the first.

23. The method according to claim 22, further comprising:
synchronizing the generation of the first and second receiving signals with respect to a start and/or an end of a block size, a frequency or a phase of the received output signal or the first and second receiving signals based on filtering and detecting a reference signal which is transmitted using the method according to claim 22.

24. A non-transitory digital storage medium having a computer program stored thereon to perform the method for transmitting an output signal, comprising:
extending a first data signal by a first reference signal in order to acquire a first extended data signal;

filtering the first extended data signal with a first IIR filter in order to acquire a first filtered data signal;

extending a second data signal by a second reference signal in order to acquire a second extended data signal;

filtering the second extended data signal with a second IIR filter in order to acquire a second filtered data signal;

combining the first and second filtered data signals in order to acquire the output signal based on the filtered data signals;

wherein a system response of the first IIR filter based on the first reference signal corresponds to a system response of the second IIR filter based on the second reference signal, wherein the reference signal is inserted in front of and after a data block of the data signal, and wherein an acquired filtered reference signal is rejected based on the reference signal placed in front of so that the output signal comprises the filtered data signals and the filtered reference signals inserted after the data block and does not comprise the filtered reference signals inserted in front of the data block, when said computer program is run by a computer.

25. A non-transitory digital storage medium having a computer program stored thereon to perform the method for receiving an output signal, comprising:

generating a first and a second receiving signal from the received output signal, wherein the output signal comprises reference signals between data blocks of the output signal, which are a system-wide known preamble;

equalizing the first receiving signal;

separating a first reference signal from the equalized first receiving signal;

equalizing the second receiving signal;

separating a second reference signal from the equalized second receiving signal; and filtering a signal portion of the first or the second equalized receiving signal with a plurality of feedback filters in order to acquire a plurality of filtered signal portions according to the plurality of feedback filters in such a way that two successive signal portions partially overlap in an overlapping portion;

combining the plurality of filtered signal portions to the filtered data signal and rejecting overlapping sequences of the filtered signal portions allocated to the overlapping portion of a first and a second filtered signal portion; and combining two filtered signal portions of two successive signal portions and rejecting an overlapping sequence with the overlapping portion of the second filtered signal portion following the first, when said computer program is run by a computer.

* * * * *